(12) United States Patent
Fairy

(10) Patent No.: US 12,006,204 B2
(45) Date of Patent: Jun. 11, 2024

(54) STATION FOR FILLING TANKS OF HYDROGEN-FUELLED VEHICLES

(71) Applicant: L'Air Liquide, Societe Anonyme pour l'Etude et l'Exploitation des Procedes Georges Claude, Paris (FR)

(72) Inventor: Vincent Fairy, Houston, TX (US)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 578 days.

(21) Appl. No.: 17/131,709

(22) Filed: Dec. 22, 2020

(65) Prior Publication Data

US 2021/0198095 A1 Jul. 1, 2021

Related U.S. Application Data

(60) Provisional application No. 62/956,067, filed on Dec. 31, 2019.

(51) Int. Cl.
*B67D 7/80* (2010.01)
*B67D 7/36* (2010.01)
(Continued)

(52) U.S. Cl.
CPC ........... *B67D 7/80* (2013.01); *B67D 7/36* (2013.01); *B67D 7/70* (2013.01); *B67D 7/72* (2013.01);
(Continued)

(58) Field of Classification Search
CPC ... B67D 7/80; B67D 7/36; B67D 7/70; B67D 7/72; F17C 9/02; F17C 2227/0135;
(Continued)

(56) References Cited

U.S. PATENT DOCUMENTS 5,771,946 A * 6/1998 Kooy ............... F17C 6/00
141/2
5,934,081 A * 8/1999 Notaro ............. F17C 5/06
62/50.2
(Continued)

FOREIGN PATENT DOCUMENTS

DE 10 2008 060127 6/2010
EP 2 837 873 2/2015
(Continued)

OTHER PUBLICATIONS

Daney, et al., "Hydrogen-fuelled vehicle fuelling station," Advances in Cryogenic Engineering, vol. 41, 1996.
(Continued)

*Primary Examiner* — Kun Kai Ma
(74) *Attorney, Agent, or Firm* — Justin K. Murray

(57) ABSTRACT

A hydrogen refilling station for filling tanks of fuel cell electric vehicles includes a liquid hydrogen tank that feeds liquid hydrogen to an upstream end of a filling circuit that also includes a heat exchanger. The heat exchanger exchanges heat between the liquid hydrogen and heat transfer fluid flows to thereby cool the heat transfer fluid and vaporize the liquid hydrogen to provide a supply of high pressure hydrogen gas for filling hydrogen-fueled vehicle tanks at a downstream end of the circuit. Because the liquid hydrogen is surrounded by the heat transfer fluid inside the heat exchanger, little if any fogging occurs.

16 Claims, 6 Drawing Sheets

(51) Int. Cl.
  *B67D 7/70* (2010.01)
  *B67D 7/72* (2010.01)
  *F17C 9/02* (2006.01)

(52) U.S. Cl.
  CPC ........ *F17C 9/02* (2013.01); *F17C 2227/0135* (2013.01); *F17C 2250/043* (2013.01)

(58) Field of Classification Search
  CPC .......... F17C 2250/043; F17C 2223/033; F17C 2227/0107; F17C 2227/0393; F17C 5/06; F17C 2221/012; F17C 2223/0161; F17C 2225/0123; F17C 2225/036; F17C 2250/01; F17C 2250/0439; F17C 2265/065; F17C 2270/0178; F17C 2270/0184; Y02E 60/32
  See application file for complete search history.

(56) References Cited

U.S. PATENT DOCUMENTS

| | | | |
|---|---|---|---|
| 2010/0005812 A1 | 1/2010 | Watts et al. | |
| 2018/0306381 A1* | 10/2018 | Fujisawa | B67D 7/78 |
| 2018/0346313 A1 | 12/2018 | Feng et al. | |
| 2019/0331298 A1 | 10/2019 | Thor et al. | |
| 2020/0095113 A1* | 3/2020 | Crispel | B67D 7/82 |

FOREIGN PATENT DOCUMENTS

| | | | | |
|---|---|---|---|---|
| JP | 2015 158 225 | | 9/2015 | |
| WO | WO-2011043308 A1 | * | 4/2011 | ................ F17C 5/06 |

OTHER PUBLICATIONS

Raman, et al., "A rapid fill hydrogen fuel station for fuel cell buses," 12th World Energy Conference Hydrogen Energy Progress 2, pp. 1629-1642.

International Search Report and Written Opinion for PCT/US2020/066740, dated Apr. 28, 2021.

* cited by examiner

STATION FOR FILLING TANKS OF HYDROGEN-FUELLED VEHICLES

CROSS-REFERENCE TO RELATED APPLICATIONS

This application claims the benefit of U.S. Provisional Application No. 62/956,067, filed Dec. 31, 2019.

BACKGROUND

Field of the Invention

The invention relates to a device for filling pressurized gas tanks.

More particularly, the invention relates to a device for filling the tanks of fuel cell electric vehicles (FCEV), the device comprising a liquefied gas source, a transfer circuit in downstream fluid communication with the liquefied gas source and comprising at least one downstream end adapted and configured to be removably connected to a vehicle hydrogen tank to be filled.

Related Art

Hydrogen gas refueling stations using liquid hydrogen sources are known. These known devices make it possible to use refrigeration from the liquid hydrogen to produce pre-cooled pressurized hydrogen gas for rapid filling without experiencing an excessive increase in the temperature of the gas in the tank during filling.

For example, Daney, et al. proposed a conceptual refilling station that uses a vaporizer for providing ambient temperature, high pressure gaseous hydrogen that is subsequently cooled prior to being fed to the vehicle tank. Daney, et al., "Hydrogen-fueled vehicle fueling station", Advances in Cryogenic Engineering, vol 41, 1996.

Another such station implemented at an urban bus refilling station utilizes a vaporizer that transfers heat from the ambient air to the pumped flow of liquid hydrogen to provide a flow of high pressure, gaseous hydrogen to the vehicle tank. Raman, et al. "A rapid fill hydrogen fuel station for fuel cell buses", 12th World Energy conference Hydrogen energy Progress 2, pp 1629-1642.

At atmospheric pressure, the boiling point of hydrogen is $-252.8°$ C. Because the station disclosed in Raman, et al. uses a vaporizer that exchanges heat between the liquid hydrogen and ambient air, the skin temperature of the ambient air vaporizer is exceedingly low. As a result, water vapor from the ambient air condenses and freezes on surfaces of the ambient air vaporizer. Also air around the ambient air vaporizer condenses and drips on the equipment below. This creates a risk for the equipment below. Equipment may become thermally embrittled, especially equipment that is made of carbon steel, and plates may crack, structural beams may fail, and pipes may burst. Since oxygen will condense at a higher temperature than nitrogen, an oxygen enriched atmosphere may be created. There are of course many known risks presented by an oxygen-rich atmosphere. Furthermore, the condensing air exacerbates the cryogenic cloud around the equipment.

When the depth of the frozen water on the surface of the ambient air vaporizer reaches an unsatisfactory depth, thereby decreasing effective heat transfer, or even results in bridging in between adjacent vanes of the ambient air vaporizer, such a vaporizer must be defrosted before further use is continued. To solve this problem, two ambient air vaporizers may be used in alternating fashion so that while one is being defrosted, the other is used to vaporize the liquid hydrogen. While this solves the problem, it can unsatisfactorily increase capital costs because of the necessity of having two ambient air vaporizers for each filling circuit. For hydrogen filling stations located in areas where the real estate is costly and/or for hydrogen filling stations co-located at a retail gasoline station where the space for the station is leased from the retail gasoline station, capital expenses are also increased because the necessity of having two vaporizers doubles the footprint or space taken up by the liquid vaporization portion of the station.

Because the skin temperature of the ambient air vaporizer is so low, water vapour in the ambient air also condenses in regions surrounding the vaporizer, creating fogging conditions.

While fogging can be a nuisance for refilling stations isolated from the public, such as in an industrial area ordinarily far from consumers, fogging is a much more serious problem for more conspicuous refilling stations, such as at retail hydrogen refilling stations, open demonstration refilling stations, and hydrogen filling stations co-located with retail gasoline stations. This is because members of the public will view the fogging emanating from a hydrogen refilling station and incorrectly conclude that either a dangerous leak of hydrogen has occurred at the station or even that a fire has broken out at the station. Erroneous reports of disastrous leaks or dangerous fires to emergency responders will therefore require that the station be subjected to an emergency stop followed by a thorough safety assessment before the station may be declared safe for operation. For this reason, the use of ambient vaporizers can seriously impede the development of hydrogen refilling stations sourced by on-site tanks of liquid hydrogen and located in conspicuous areas viewable by the public.

SUMMARY OF THE INVENTION

An aim of the invention is to overcome all or some of the prior art disadvantages stated above.

There is disclosed a hydrogen refilling station, comprising a liquid hydrogen source adapted and configured to store liquid hydrogen, a filling circuit, and a heat exchange fluid circuit. The filling circuit has an upstream end in downstream fluid communication with the liquid hydrogen source to allow a flow of liquid hydrogen from the source into the filling circuit, a downstream end adapted and configured to be removably connected with a FCEV tank for filling of the tank with, and a first heat exchanger disposed between the upstream and downstream ends of the filling circuit. The heat transfer circuit comprises, in flow order, an upstream end in downstream flow communication with the first heat exchanger, a second heat exchanger, a heat transfer fluid pump, and a downstream end in upstream flow communication with the first heat exchanger, the heat transfer fluid pump being adapted and configured to receive the heat transfer fluid from the second heat exchanger and direct it to the first heat exchanger. The second heat exchanger is adapted and configured to warm cooled heat transfer fluid received from the first heat exchanger. The first heat exchanger is adapted and configured to exchange heat between the heat transfer fluid flowing through the heat transfer circuit and liquid hydrogen in the filling circuit so as to cool the heat transfer fluid and vaporize the liquid hydrogen to provide the pressurized, gaseous hydrogen for filling the tank, the flow of liquid hydrogen inside the first heat exchanger being surrounded by the flow of the heat transfer fluid.

There is also disclosed a hydrogen refilling station, comprising a liquid hydrogen source adapted and configured to store liquid hydrogen, first and second filling circuits, a heat transfer fluid reservoir, and first and second heat exchange fluid circuits, wherein: the first filling circuit has an upstream end in downstream fluid communication with the liquid hydrogen source to allow a flow of liquid hydrogen from the source into the first filling circuit, a downstream end adapted and configured to be removably connected with a hydrogen-fueled vehicle tank for filling of the tank with, and a first heat exchanger disposed between the upstream and downstream ends of the first filling circuit; the second filling circuit has an upstream end in downstream fluid communication with the liquid hydrogen source to allow a flow of liquid hydrogen from the source into the second filling circuit, a downstream end adapted and configured to be removably connected with a hydrogen-fueled vehicle tank for filling of the tank with, and a first heat exchanger disposed between the upstream and downstream ends of the second filling circuit; the first heat transfer circuit comprises, in flow order, an upstream end in downstream flow communication with the first heat exchanger of the first filling circuit, a second heat exchanger, a heat transfer fluid pump, and a downstream end in upstream flow communication with the first heat exchanger of the first filling circuit, the heat transfer fluid pump of the first heat transfer circuit being adapted and configured to receive the heat transfer fluid from the second heat exchanger of the first heat transfer circuit and direct it to the first heat exchanger of the first filling circuit; the second heat transfer circuit comprises, in flow order, an upstream end in downstream flow communication with the first heat exchanger of the second filling circuit, a second heat exchanger, a heat transfer fluid pump, and a downstream end in upstream flow communication with the first heat exchanger of the second filling circuit, the heat transfer fluid pump of the second heat transfer circuit being adapted and configured to receive the heat transfer fluid from the second heat exchanger of the second heat transfer circuit and direct it to the first heat exchanger of the second filling circuit; the second heat exchanger of the first heat transfer circuit is adapted and configured to warm cooled heat transfer fluid received from the first heat exchanger of the first heat transfer circuit; and the second heat exchanger of the second heat transfer circuit is adapted and configured to warm cooled heat transfer fluid received from the first heat exchanger of the second heat transfer circuit; the heat transfer fluid reservoir is in fluid communication between the second heat exchanger and heat transfer fluid pump of the first heat transfer circuit and is in fluid communication between the second heat exchanger and heat transfer fluid pump of the second heat transfer circuit; the first heat exchanger of the first filling circuit is adapted and configured to exchange heat between the heat transfer fluid flowing through the first heat transfer circuit and liquid hydrogen in the first filling circuit so as to cool the heat transfer fluid and vaporize the liquid hydrogen to provide the pressurized, gaseous hydrogen for filling a tank of a hydrogen-fueled vehicle, the flow of liquid hydrogen inside the first heat exchanger of the first filling circuit being surrounded by the flow of the heat transfer fluid; and the first heat exchanger of the second filling circuit is adapted and configured to exchange heat between the heat transfer fluid flowing through the second heat transfer circuit and liquid hydrogen in the second filling circuit so as to cool the heat transfer fluid and vaporize the liquid hydrogen to provide the pressurized, gaseous hydrogen for filling a tank of a hydrogen-fueled vehicle, the flow of liquid hydrogen inside the first heat exchanger of the second filling circuit being surrounded by the flow of the heat transfer fluid.

There is also disclosed a method of filling a hydrogen-fueled vehicle tank with pressurized hydrogen, comprising the following steps. Liquid hydrogen is fed from a source of liquid hydrogen a filling circuit whose downstream end is removably connected to a tank of a hydrogen-fueled vehicle, the filling circuit having a first heat exchanger is disposed therein, the first heat exchanger having a liquid hydrogen inlet, a gaseous hydrogen outlet, a heat transfer fluid inlet, and a heat transfer fluid outlet. A heat transfer fluid is pumped with a heat transfer pump through a heat transfer circuit looping from and to the first heat exchanger, the heat transfer circuit comprising, in flow order from the heat transfer fluid outlet to the heat transfer fluid inlet, a second heat exchanger and the heat transfer fluid pump. Heat is exchanged, with the first heat exchanger, between the heat transfer fluid flowing through the heat transfer fluid circuit and the liquid hydrogen fed to the filling circuit from the source, thereby vaporizing the fed liquid hydrogen and cooling the heat transfer fluid, wherein the fed liquid hydrogen inside the first heat exchanger is surrounded by the heat transfer fluid. The cooled heat transfer fluid received from the first heat exchanger is heated with the second heat exchanger. A tank of a hydrogen-fueled vehicle is filled with pressurized, gaseous hydrogen from the downstream end of the filling circuit.

The station or method may include one or more of the following aspects:
  liquid hydrogen is pumped with a liquid hydrogen pump from the source into the filling circuit.
  a pressure of the pressurized, gaseous hydrogen in the filling circuit downstream of the first heat exchanger is measured with a pressure sensor; and a pressure of the pressurized, gaseous hydrogen is controlled with a pressure control valve based upon the pressure of the pressurized, gaseous hydrogen measured by the pressure sensor.
  a liquid hydrogen pump is in downstream flow communication with the liquid hydrogen source and upstream flow communication with the first heat exchanger and is adapted and configured to increase a pressure of the flow of liquid hydrogen from the liquid hydrogen source and to direct the pressurized flow of liquid hydrogen towards the first heat exchanger.
  the filling circuit further comprises a pressure control valve and a pressure sensor downstream of the first exchanger and the pressure control valve is adapted and configured to control a pressure of the pressurized, gaseous hydrogen for filling the tank based upon a pressure of the pressurized, gaseous hydrogen measured by the pressure sensor.
  the heat transfer circuit further comprises a primary line, a bypass line, a three-way flow control valve, a temperature sensor, and a downstream line in flow communication between the three-way flow control valve and the heat transfer fluid pump; the primary line extends in flow communication between the first heat exchanger and the three-way flow control valve; the bypass line branches off of the primary line and is in upstream flow communication with the three-way flow control valve; the second heat exchanger is disposed in the primary line; the three-way flow control valve controls flows of warmed heat transfer fluid from the primary line and non-warmed heat transfer fluid from the bypass line, combines the flow of the warmed heat transfer fluid from the primary line and the flow of the non-warmed heat transfer fluid from the bypass line, and directs the combined flow of heat transfer fluid to the heat transfer pump; the temperature sensor is disposed in the heat transfer circuit in between the three-way flow control valve and the first heat exchanger; and the three-way control valve controls a temperature of the heat transfer fluid in between the three-way control valve and the first heat exchanger by adjusting a ratio of the flow rate of the warmed heat transfer fluid to the flow rate of the non-warmed heat transfer fluid in the combined flow of heat transfer fluid.

the heat transfer fluid circuit further comprises a blower that is adapted and configured to blow ambient air at the second heat exchanger so as to warm the heat transfer fluid with the heat of the blown ambient air.

the second heat exchanger is an electric heater adapted and configured to warm the heat transfer fluid.

the station includes two or more buffer containers, a leg branching off of the filling circuit downstream of the first heat exchanger that is adapted and configured to direct the pressurized, gaseous hydrogen from the first heat exchanger to the two or more buffer containers, a set of valves, and a pressure control valve, the set of valves being adapted and configured to allow the pressurized, gaseous hydrogen to flow through the leg and into one of the buffer containers but not into other of the buffer containers and allow the pressurized, gaseous hydrogen to flow from one of the buffer containers through the leg and to the downstream end of the filling circuit, the pressure control valve being adapted and configured to control a pressure of the pressurized, gaseous hydrogen flowing out of the downstream end of the filling circuit based upon a pressure sensed by a pressure sensor disposed in the filling circuit between the leg and the downstream end of the filling circuit.

the filling circuit further comprises a primary line in fluid communication between the upstream and downstream ends of the filling circuit, a bypass line that branches off from the primary line and recombines with the primary line downstream of the first heat exchanger, a flow control valve disposed in the primary line, a flow control valve disposed in the bypass line, and a temperature sensor disposed in the filling circuit downstream of a point where the bypass line recombines with the primary line and upstream of the downstream end of the filling circuit, the first heat exchanger being disposed in the primary line, the flow control valve disposed in the primary line being adapted and configured to control a flow of vaporized hydrogen flowing through the primary line, the flow control valve disposed in the bypass lines being adapted and configured to control a flow of liquid hydrogen flowing through the bypass line, the flow control valves controlling the flows of vaporized hydrogen and liquid hydrogen to in turn control a temperature of the pressurized, gaseous hydrogen for filling the tank that is based upon a temperature sensed by the temperature sensor.

the heat transfer circuit further comprises a heat transfer reservoir in fluid communication between the second heat exchanger and the heat transfer pump, the heat transfer reservoir being adapted and configured to contain a volume of the heat transfer fluid.

the station further comprises: a first liquid hydrogen pump in downstream flow communication with the liquid hydrogen source and upstream flow communication with the first heat exchanger of the first filling circuit that is adapted and configured to increase a pressure of the flow of liquid hydrogen from the liquid hydrogen source and direct the pressurized flow of liquid hydrogen towards the first heat exchanger of the first filling circuit; and a second liquid hydrogen pump in downstream flow communication with the liquid hydrogen source and upstream flow communication with the first heat exchanger of the second filling circuit that is adapted and configured to increase a pressure of the flow of liquid hydrogen from the liquid hydrogen source and direct the pressurized flow of liquid hydrogen towards the first heat exchanger of the second filling circuit.

each of the filling circuits further comprises a pressure control valve and a pressure sensor downstream of the associated first exchanger and the pressure control valve is adapted and configured to control a pressure of the pressurized, gaseous hydrogen for filling a tank of a hydrogen-fueled vehicle based upon a pressure of the pressurized, gaseous hydrogen measured by the pressure sensor.

each of the heat transfer circuit further comprises a primary line, a bypass line, a three-way flow control valve, a temperature sensor, and a downstream line in flow communication between the three-way flow control valve and the heat transfer fluid pump; each primary line extends in flow communication between the associated first heat exchanger and the associated three-way flow control valve; each bypass line branches off of the associated primary line and is in upstream flow communication with the associated three-way flow control valve; each second heat exchanger is disposed in the associated primary line; each three-way flow control valve controls flows of warmed heat transfer fluid from the associated primary line and non-warmed heat transfer fluid from the associated bypass line, combines the flow of the warmed heat transfer fluid from the associated primary line and the flow of the non-warmed heat transfer fluid from the associated bypass line, and directs the combined flow of heat transfer fluid to the associated heat transfer pump; each temperature sensor is disposed in the associated heat transfer circuit in between the associated three-way flow control valve and the associated first heat exchanger; and each three-way control valve controls a temperature of the heat transfer fluid in between it and the associated first heat exchanger by adjusting a ratio of the flow rate of the warmed heat transfer fluid to the flow rate of the non-warmed heat transfer fluid in the combined flow of heat transfer fluid.

each heat transfer fluid circuit further comprises a blower that is adapted and configured to blow ambient air at the associated second heat exchanger so as to warm the heat transfer fluid with the heat of the blown ambient air.

each second heat exchanger is an electric heater adapted and configured to warm the heat transfer fluid.

each filling circuit further comprises: a primary line in fluid communication between its upstream and downstream ends; a bypass line that branches off from the associated primary line and recombines with the associated primary line downstream of the associated first heat exchanger; a flow control valve disposed in the associated primary line; a flow control valve disposed in the associated bypass line; and a temperature sensor disposed downstream of a point where the associated bypass line recombines with the associated primary line and upstream of the associated downstream end thereof, wherein: the associated first heat exchanger is disposed in the associated primary line; the flow control valve disposed in the associated primary line being adapted and configured to control a flow of vaporized hydrogen flowing through the associated primary line; the flow control valve disposed in the associated bypass line being adapted and configured to control a flow of liquid hydrogen flowing through the associated bypass line, the flow control valves controlling the flows of vaporized hydrogen and liquid hydrogen to in turn control a temperature of the pressurized, gaseous hydrogen for filling a tank of a hydrogen-fueled vehicle that is based upon a temperature sensed by the temperature sensor.

the downstream end comprises at least two nozzles each of which is adapted and configured to be removably connected with a hydrogen-fueled vehicle tank for filling of the tank with.

BRIEF DESCRIPTION OF THE FIGURES

Other characteristic features and advantages will emerge upon reading the following description, with reference to the figures in which.

Figure 1:
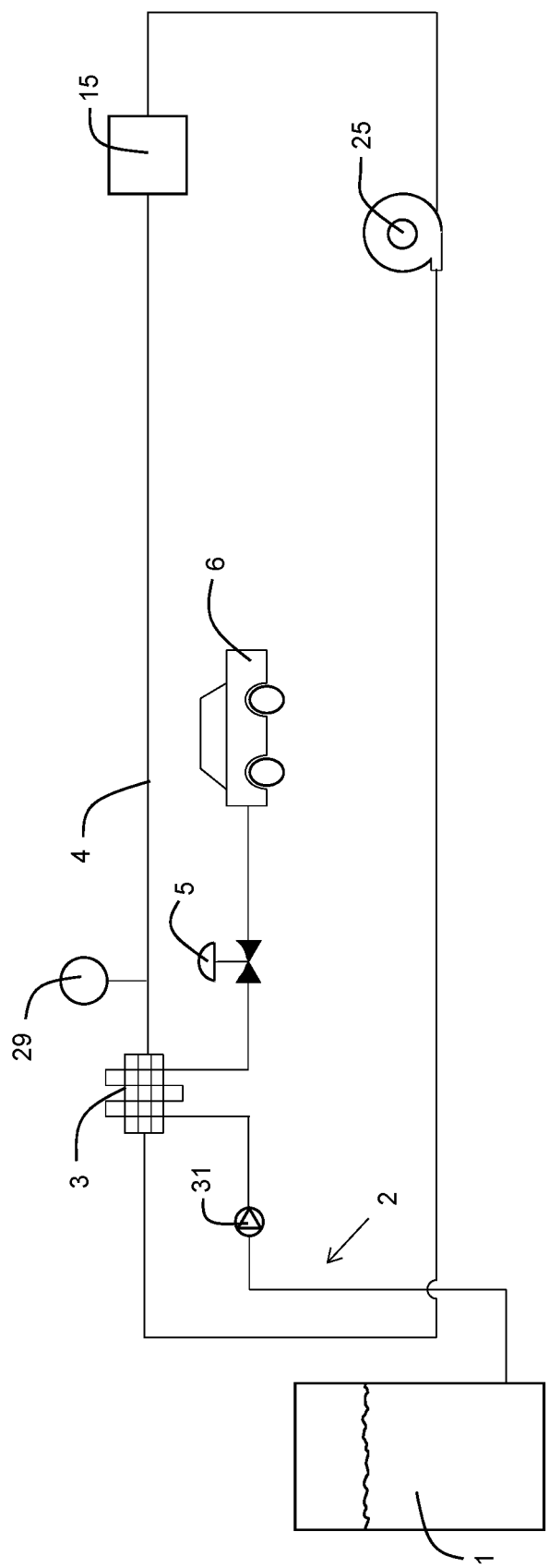
FIG. 1 is a schematic view of an embodiment of the inventive station and method of the invention.

LEGEND liquid hydrogen source 1
filling circuit 2
first heat exchanger 3
heat transfer fluid circuit 4
pressure control valve 5
vehicle 6
optional chiller 7
pressure sensor 9
shut-off valve 10
temperature sensor 11
second heat exchanger 15
heat transfer fluid circuit primary line 16
heat transfer fluid circuit bypass line 17
blower 19
three-way control valve 21
heat transfer fluid reservoir 23
heat transfer fluid pump 25
temperature sensor 27
temperature sensor 29
liquid hydrogen pump 31
valve 33
buffer container 35
leg 37 filling circuit primary line 39
filling circuit bypass line 41
combination point 42
temperature control valve 43
temperature control valve 45
shut-off valve 46
shut-off valve 48
shut-off valve 50

DETAILED DESCRIPTION OF THE INVENTION

As best shown in FIG. 1, liquid hydrogen from a liquid hydrogen source 1 is fed to a filling circuit 2, via an upstream end thereof, that includes a first heat exchanger 3, a pressure control valve 5, a second heat exchanger 15. The downstream end of the filling circuit 2 is removably connected to a tank of a hydrogen fuel cell electric vehicle (FCEV) 6. Heat transfer fluid flows in a heat transfer fluid circuit 4 that includes a heat transfer fluid pump 25, a temperature sensor 27, and a liquid hydrogen pump 31.

The source optionally includes a pressure building circuit for building pressure in a headspace of the source by controlling amounts of liquid hydrogen from the source to exit the source and enter into a line in thermal connection with ambient air, using a flow control valve. The liquid hydrogen vaporizes in the line and is directed into the headspace. A pressure sensor measures a pressure inside the headspace. A controller is used to actuate the flow control valve based upon the measured headspace pressure so as to reach a desired pressure in the headspace.

The liquid hydrogen pump 31 is used to feed and pressurize the liquid hydrogen from the source and into the filling circuit. The use of a liquid hydrogen pump 31 allows the liquid hydrogen to be pumped to the supercritical pressures that are desired for high pressure fills of the tanks of the hydrogen-fueled vehicle 6. For example, liquid hydrogen stored in the source 1 at a pressure of around 50 bar may be easily pumped to a pressure of 900 bar or even higher. The properties and features of the particular liquid hydrogen pump 31 employed are ordinarily driven by the desired maximum pressure to be provided to the tank of the FCEV 6 and the desired filling capacity of the refilling station. Preferably, each liquid hydrogen pump 31 is characterized by the following operating conditions: a net positive suction head of 2-5 psi, a nominal flow capacity of 45 kg/h, a 100 psi liquid hydrogen suction pressure, and a maximum discharge pressure of about 15,000 psi.

Liquid hydrogen fed into the filling circuit 2 from the source 1 is vaporized at the first heat exchanger 3 to provide pressurized, gaseous hydrogen for filling the tank of the FCEV 6. The first heat exchanger 3 exchanges heat between the heat transfer fluid flowing in the heat transfer fluid circuit 4 and the liquid hydrogen flowing in the filling circuit 2, thereby vaporizing the liquid hydrogen (yielding cold hydrogen in supercritical fluid state) and cooling the heat transfer fluid. The vaporized liquid hydrogen constitutes the pressurized, gaseous hydrogen used to filling the tank of the hydrogen-fueled vehicle 6. Either a driver/customer of the FCEV 6 or an operator of the refilling station may access the nozzle (at the downstream end of the filling circuit 2) conveniently located at an interface typically found at a standard gasoline station (i.e., a gas pump) which includes a display of the price of the hydrogen, the quantity of hydrogen delivered, and a start/stop button.

The cooled heat transfer fluid is warmed at the second heat exchanger 15 and pumped back to the first heat exchanger 3 using the heat transfer fluid pump 25. The second heat exchanger 15 may be an ambient air vaporizer in which the cooled heat transfer fluid is warmed with the heat from the ambient air blown onto the ambient air vaporizer with the blower. Optionally, the second heat exchanger may be an electric heater.

While any known heat transfer fluid that is in the liquid phase at nominal pressures down to at least −135° C., a non-limiting and particularly suitable example of one is available from Eastman under the brand name Therminol VLT®. Therminol VLT® is a mixture of methylcyclohexane and trimethylpentane and has a reported liquid heat capacity ranging from 1.29 kJ/(kg·K) at −135° C. to 2.04 kJ/(kg·K) at 40° C.

The temperature of the heat transfer fluid may be controlled as follows. A controller (not illustrated) controls the speed of the heat transfer fluid pump 25 (such as by increasing or decreasing the speed of a variable frequency drive of the pump 25) based upon the temperature of the heat transfer fluid sensed by temperature sensor 29. If the temperature of the heat transfer fluid just upstream of the first heat exchanger 3 is unsatisfactorily high, it will impair the ability of the heat transfer fluid to warm the liquid hydrogen flowing through the first heat exchanger 3. On the other hand, if the temperature of the heat transfer fluid is too low, it may become too viscous or even frozen. The controller is typically a computer or programmable logic controller. More specifically, the temperature of the heat transfer fluid downstream of the first heat exchanger may be controlled within a temperature range or according to a temperature set point.

Inside the first exchanger 3, the flow of liquid hydrogen is surrounded by the flow of heat transfer fluid. This prevents an exterior skin temperature of the first exchanger 3 from reaching the exceedingly cold temperatures experienced by ambient air vaporizers of conventional liquid hydrogen-source hydrogen filling stations. Thus, condensation of water vapor upon the first heat exchanger 3 and consequent frosting (and the associated problems of defrosting in the prior art as discussed above) is avoided. Also, condensation of water vapor in regions surrounding the first exchanger 3 (and the associated problems of fogging in the prior art as discussed above) is avoided. Typically, the configuration of the first heat exchanger 3 is tube-in-tube where the liquid hydrogen flows through the inner tube and the heat transfer fluid flows in the outer tube. For pressures of about 900 bar, a tube in tube heat exchanger is less complex and less costly than a shell and tube heat exchanger. The first heat exchanger may instead be a shell and tube heat exchanger in which the tube fluid is liquid hydrogen and the shell fluid is the heat transfer fluid. Types of heat exchangers other than the pipe-in-pipe or shell and tube configurations may be used for the first heat exchanger 3 may be used with the invention so long as the liquid hydrogen is surrounded by heat transfer fluid and/or the skin temperature of an exterior of the first heat exchanger 3 does not reach the exceedingly low temperatures of conventional ambient air vaporizers and fogging and frosting are avoided. Portions of the filling circuit upstream of the first heat exchanger may be vacuum-jacketed to prevent the frosting and fogging problems.

The pressure of the hydrogen used to fill the tank of the FCEV 6 may be controlled with a pressure control valve 5. While the particular manner in which the tank is filled is not limited, typically the tank is filled according to a standard filling scheme such as the Society of Automotive Engineers (SAE) standard J2601. The pressure control valve 5

Figure 2:
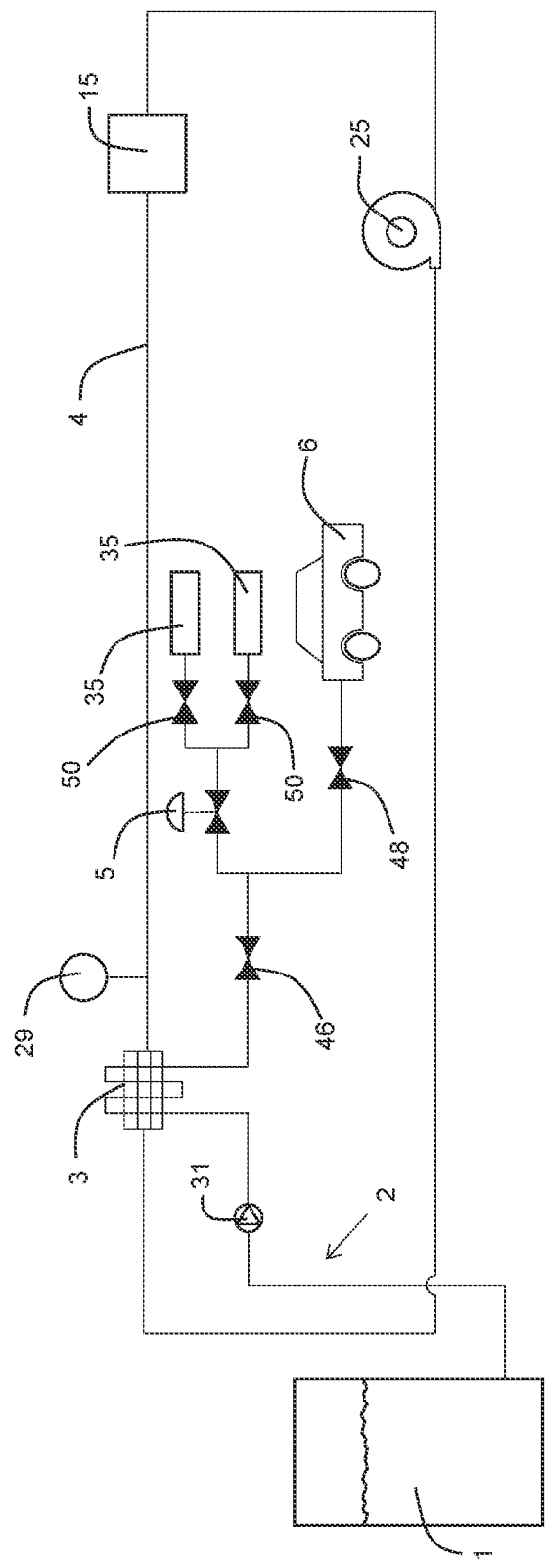
FIG. 2 is a schematic view of a variant of the station and method of FIG. 1.

As best illustrated in FIG. 2, the hydrogen filling station may also include one or more buffer containers 35 for containing high pressure hydrogen, downstream of the first heat exchanger. Each of the buffer containers may be provided with a pressure building circuit in order to maintain a desired pressure within. The vaporized hydrogen is fed to the buffer containers via a leg 37 appending from the filling circuit 2. The pressure control valve 5 may be used to fill the tank of the hydrogen-fueled vehicle using a filling algorithm as discussed above. As in FIG. 1, the liquid hydrogen is pumped to high pressure by liquid hydrogen pump 31 and heated by the heat transfer fluid at the first heat exchanger 3. Shut-off valve 48 is closed, shut-off valve 46 is open, and one or more of the shut-off valves 50 are open. Instead of being fed to the FCEV directly, the cold supercritical hydrogen is used to fill one more of the buffer containers 35. Optionally, one of the buffer containers 35 is at medium pressure while another is at high pressure. By selective opening or closing of the shut-off valves 50, the buffer container 35 at high pressure may be filled first and the buffer container 35 at medium pressure filled second. Unless one or more of the buffer containers 35 is at an undesirably low pressure, the liquid hydrogen pump 31 need not be continuously run. If the buffer containers 35 are full, the tank of the FCEV 6 may be filled with hydrogen stored in the buffer containers 35 in a cascade fill in which the buffer container 35 at medium pressure is pressure-equalized with the tank of the FCEV 6 and subsequently the buffer container 35 at high pressure is pressure-equalized with the tank as is known in the art.

Figure 3:
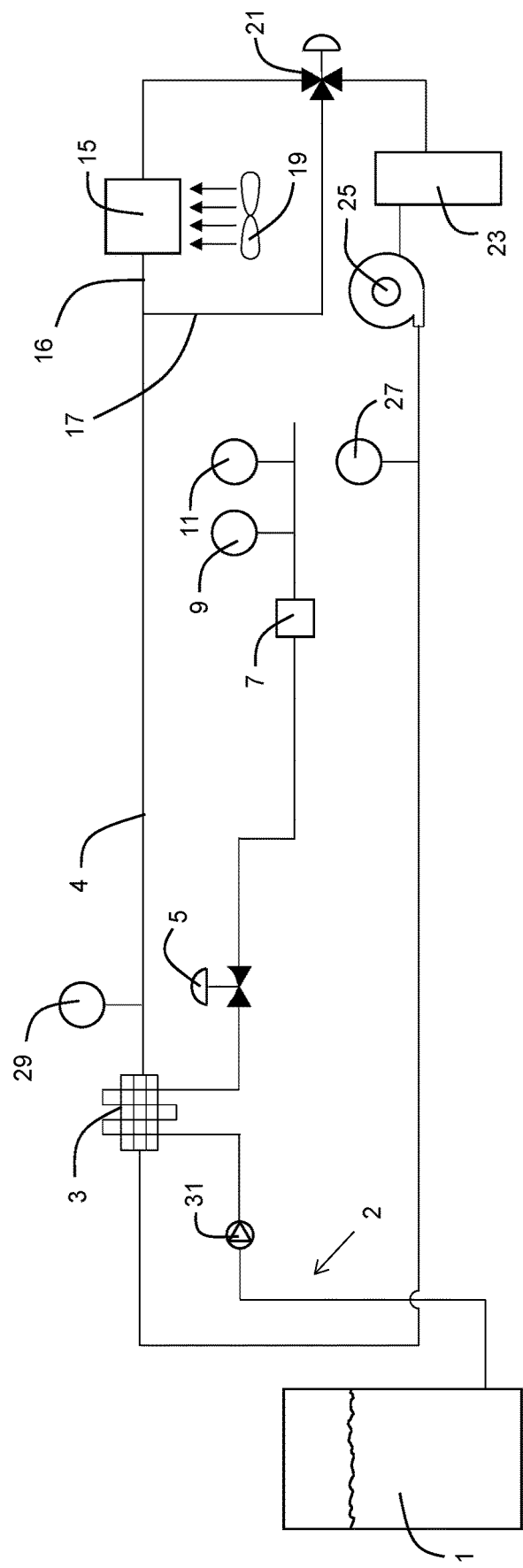
FIG. 3 is a schematic view of a variant of the station and method of FIG. 1.

As best shown in FIG. 3, the second heat exchanger 15 may be an ambient air vaporizer, the filling circuit 2 may also include an optional chiller 7 and pressure and temperature sensors 9, 11, and the heat transfer fluid circuit 4 may include a heat transfer fluid reservoir 23 and a temperature sensor 27. The tank of an FCEV may be filled using the pressure control valve 5 as described above, based upon the pressure and temperature sensed by pressure and temperature sensors 9, 11. The heat transfer fluid circuit 4 is provided with a primary line 16 in which the second heat exchanger 15 is disposed. The cooled heat transfer fluid is warmed with the heat from the ambient air blown onto the second heat exchanger 15 with a blower 19. Optionally, there is also a bypass line 17 that branches off of the primary line 16 such that a portion of the cooled heat transfer fluid is not warmed at the second heat exchanger 15. In such an optional case, the warmed heat transfer fluid in the primary line 16 is combined with the non-warmed heat transfer fluid in the bypass line 17 using a three-way control valve 21. Because the ambient air temperature blown by the blower 19 will vary with the time of year, the three-way control valve 21 may be controlled according to a control scheme which varies by the season. For example, during the winter in the northern hemisphere, the entirety of the flow of the heat transfer fluid may be fed through the primary line 16 and be heated at the second heat exchanger 15, whereas during the summer, a portion or all of the flow of the heat transfer fluid may be fed through the bypass line 17 in order to yield a colder heat transfer fluid for storage in a heat transfer fluid reservoir 23. This is helpful during especially hot weather in the summer when heat leaks impair the ability to maintain the heat transfer fluid below a maximum predetermined temperature.

The temperature of the combined flow of heat transfer fluid from the three-way control valve 21 may alternatively be controlled in the following manner. A controller (which may be the same as or different from the controller used to control the temperature of the heat transfer fluid downstream of the first heat exchanger 3) controls actuation of the three-way control valve to achieve a ratio of the flow of warmed heat transfer fluid in the primary line and non-warmed heat transfer fluid in the bypass line based upon the temperature measured by the temperature sensor of the heat transfer circuit.

The pressure and temperature sensors 9, 11 may be used to input a pressure and temperature of the hydrogen delivered to the FCEV tank as variables into a filling algorithm as described above. In particular, the filing algorithm is in compliance with SAE standard J2601.

Figure 4:
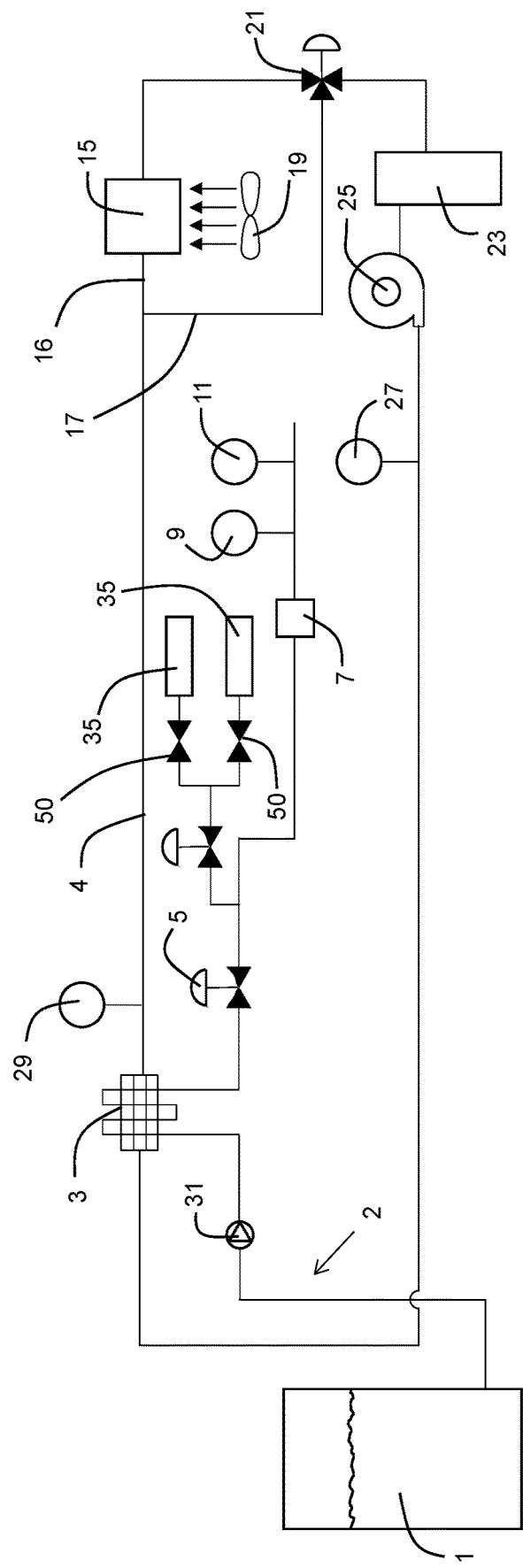
FIG. 4 is a schematic view of a combination of features of the stations and methods of FIGS. 2 and 3.

As best in shown in FIG. 4, the features of the embodiments of FIGS. 2 and 3 may be combined.

Figure 5:
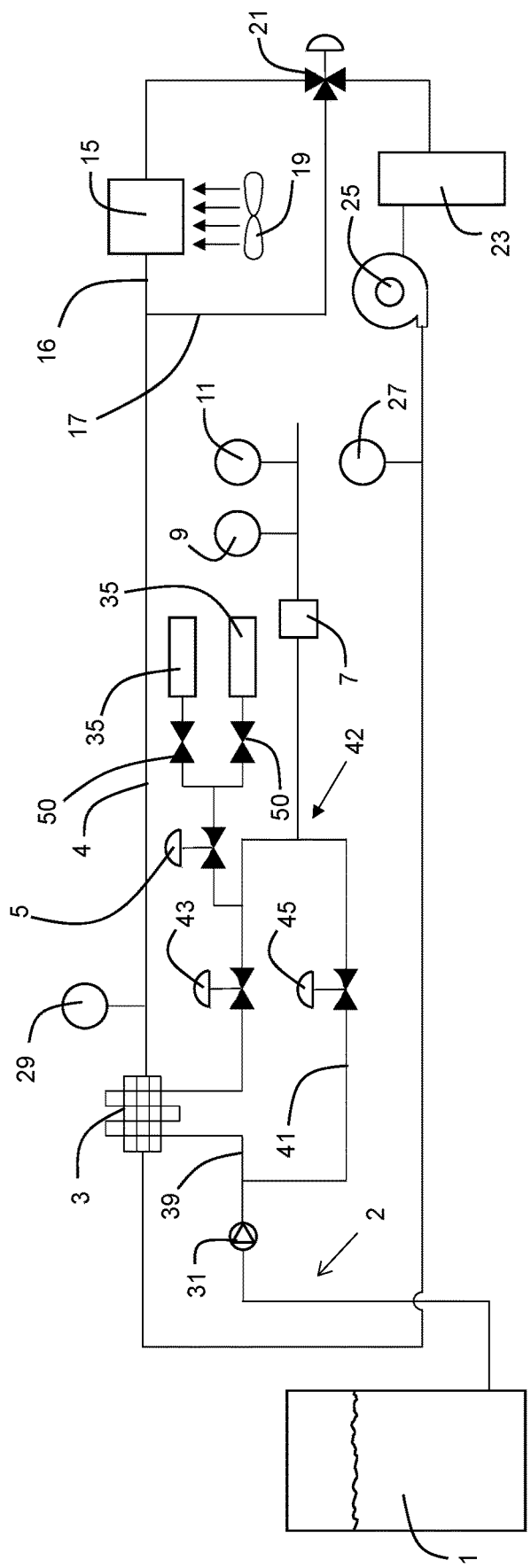
FIG. 5 is a schematic view of a variant of the station and method of FIG. 4.

As best illustrated in FIG. 5, the filling circuit includes a primary line 39 and a bypass line 41 that branches off of the primary line. The portion of the liquid hydrogen fed to the primary line 39 is vaporized at the first heat exchanger 3 while the portion of the liquid hydrogen fed to the bypass line 41 is not. The two flows of hydrogen are combined at a point 42 downstream of the first heat exchanger 3 to provide the pressurized, gaseous hydrogen. The temperature of the pressurized, gaseous hydrogen may be controlled by controlling the flows of liquid hydrogen into the primary and bypass lines 39, 41 with temperature control valves 43, 45. The temperature control valves 43, 45 may be controlled with a controller (not shown but examples include a computer or a programmable logic controller which may be the same as or different from controller(s) that controls operation of the three-way control valve 21 and/or the liquid hydrogen pump variable frequency drive) based upon the temperature measured by the temperature sensor 11. The skilled artisan will recognize that, when the temperature sensed by the temperature sensor is too low (high), the flow of liquid hydrogen to the primary line 39 may be increased (decreased) and the flow of liquid hydrogen to the bypass line 41 may be decreased (increased) by a corresponding amount. Thus, control of the pressurized, gaseous hydrogen may be performed without the optional chiller 7 or the optional chiller 7 may provide supplemental refrigeration only. In this embodiment, the flow of gaseous hydrogen to the FCEV tank is controlled by pressure control valve 5, optionally based upon the pressure and temperature sensed by the pressure and temperature sensors 9, 11 as explained above. If the FCEV tank is not being filled with hydrogen from the buffer containers 35, shut-off valves 50 are closed and the two flows of hydrogen are combined at a point 42 downstream of the first heat exchanger 3 to provide the pressurized, gaseous hydrogen for filling the FCEV tank. If one of the buffer containers 35 is being used to fill the FCEV tank, one of the shut-off valves 50 is closed, one of the shut-off valves 50 is open and a flow of hydrogen from one of the buffer containers 35 is combined with a flow of liquid hydrogen from the bypass line 41 at the point 42 downstream of the first heat exchanger 3. During such a fill, the pump 31 may keep running or optionally it may be turned off. Regardless of whether the vaporized hydrogen is obtained directly from the primary line 39 or from one of the buffer containers 35, the temperature of the pressurized, gaseous hydrogen may be controlled by controlling the flows of liquid hydrogen in the primary and bypass lines with temperature control valves 43, 45. The temperature control valves 43, 45 may be controlled with a controller (not shown but examples include a computer or a programmable logic controller which may be the same as or different from controller 29) based upon the temperature measured by the temperature sensor. The skilled artisan will recognize that, when the temperature sensed by the temperature sensor is too low (high), the flow of liquid hydrogen to the primary line 39 may be increased (decreased) and the flow of liquid hydrogen to the bypass line 41 may be decreased (increased) by a corresponding amount. Thus, control of the temperature of the pressurized, gaseous hydrogen may be performed without the optional chiller or the optional chiller may provide supplemental refrigeration only. In this embodiment, the flow of gaseous hydrogen to the FCEV tank is controlled by pressure control valve based upon the pressure sensed by the pressure sensor.

Figure 6:
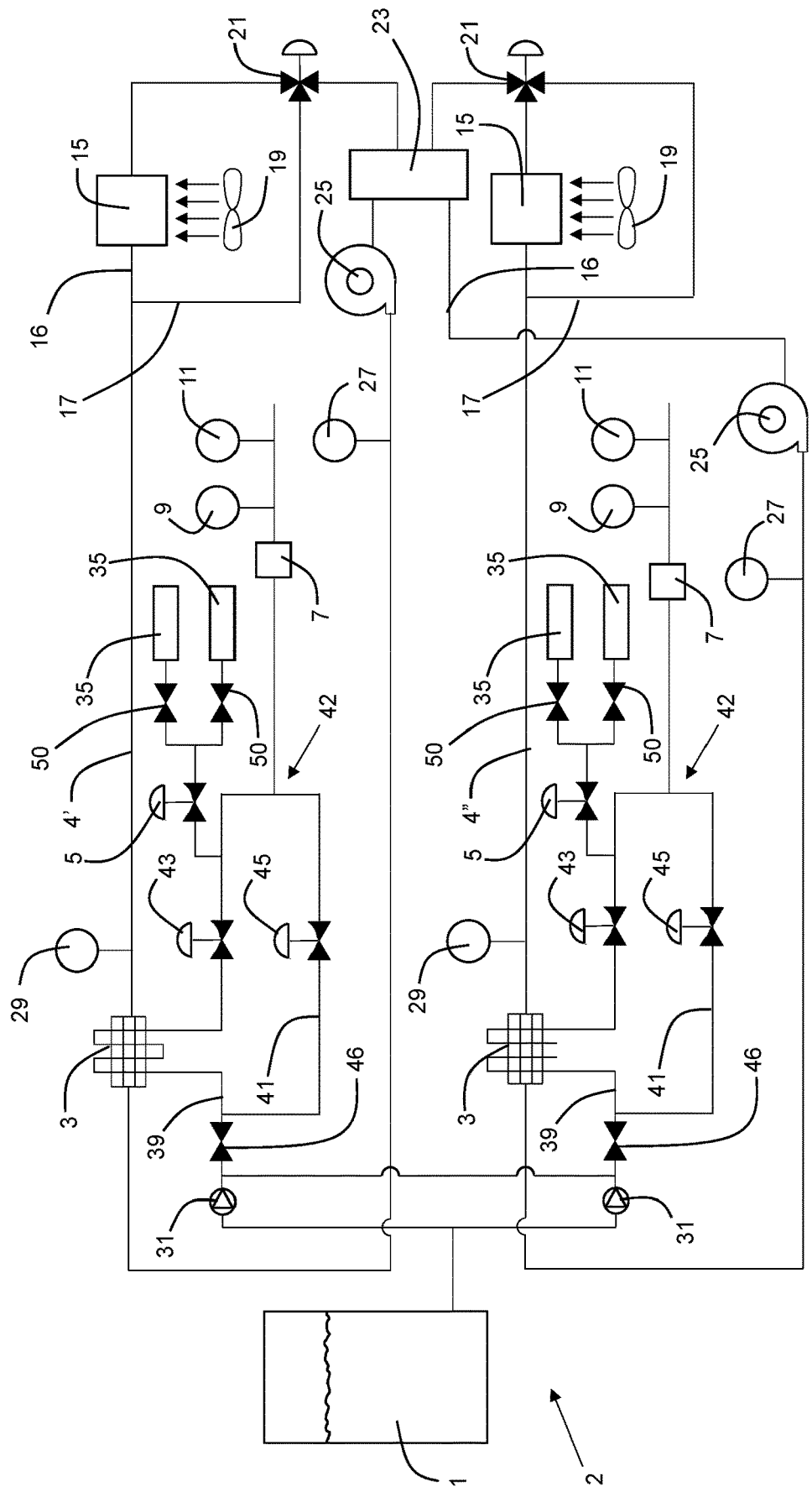
FIG. 6 is a schematic view of a variant of the station and method of FIG. 5.

In a variant of the embodiment of FIG. 5 and as best illustrated in FIG. 6, the station may have two filling circuits 4', 4". This allows the liquid hydrogen from the source 1 to be supplied to either of the liquid hydrogen pumps 31 and compressed liquid hydrogen may be supplied to either of the two filling circuits 4', 4' from either liquid hydrogen pump. Although not illustrated, a single set of buffer containers 35 may be shared in common with each of the filling circuits 4', 4" allows the size of the buffer containers to be optimized, thereby decreasing capital costs.

In each of the foregoing embodiments, it should be noted that the downstream end may be equipped with at least two nozzles. Each of the nozzles is adapted and configured to be removably connected with the tank of a FCEV for filling of the tank with. While any known configuration of nozzle may be used, typically the nozzle is part of a hydrogen dispenser available from Tatsuno Corporation for use in retail hydrogen refilling stations.

Regardless of the particular embodiment, while the refilling station may be located anywhere FCEV tanks need refilling, it is of particular usefulness when located at a retail fuel station fitted with hydrogen dispensers for use by drivers of FCEVs who do not necessarily have any training in the handling and dispensing of high pressure hydrogen. In a preferred filling sequence, after the nozzle is connected in gas-tight fashion with the FCEV tank, gaseous hydrogen is first fed from the lowest pressure buffer container (that is at a pressure higher than that of the hydrogen in the tank) and into the tank in order to decrease the impact of the Joule-Thomson effect. The particular manner in which the filling is performed is dictated by the filling algorithm, such as one compliant with the SAE J2601 standard. Control of the pressure of the gaseous hydrogen from the nozzle is done with a pressure control valve based upon the pressure of the gaseous hydrogen by a pressure sensor in the nozzle or in the tank. When the lower pressure buffer container and the tank are essentially pressure-equalized, gaseous hydrogen is instead dispensed from a higher pressure buffer container and into the tank. This is continued until completion of the fill, according to the algorithm, is indicated. Before another FCEV tank is filled, the liquid hydrogen is pumped from the source to the first heat exchanger and the result pressurized gaseous hydrogen is used to refill the buffer containers.

The invention provides several advantages.

The vaporizer used in the invention need not be very tall. Indeed, it can remain under 10' in height. This is important because, in urban locations, the presence of overhead power lines, telephone lines, or trees restricts the vertical space that may be taken up by conventional ambient air vaporizers. In contrast to the vaporizer used in the invention, conventional ambient air vaporizers often exceed 10' in height.

In comparison to ambient air vaporizers, the vaporizer used in the invention allows more precise control of the outlet temperature of the hydrogen at the dispenser that is necessary for meeting stringent temperature control profiles required by many hydrogen filling protocols, such as the SAE J2601. Because conventional ambient air vaporizers exchange heat with liquefied cryogenic gases in a largely passive manner, the temperature of the vaporized cryogen will highly depend upon the ambient temperature. In the invention, the temperature of the heat transfer fluid exiting the second heat exchanger may be precisely controlled through precise control of the blower speed or the electrical power supplied to a heater. This in turn allows more precise control of the vaporized hydrogen exiting the first heat exchanger after exchanging heat with the temperature-controlled heat transfer fluid.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A hydrogen refilling station, comprising a liquid hydrogen source adapted and configured to store liquid hydrogen, a filling circuit, and a heat exchange fluid circuit, wherein:
    the filling circuit has an upstream end in downstream fluid communication with the liquid hydrogen source to allow a flow of liquid hydrogen from the liquid hydrogen source into the filling circuit, a downstream end adapted and configured to be removably connected with a hydrogen-fueled vehicle tank for filling of the hydrogen-fueled vehicle tank with liquid hydrogen, and a first heat exchanger disposed between the upstream and downstream ends of the filling circuit;
    the heat transfer circuit comprises, in flow order, an upstream end in downstream flow communication with the first heat exchanger, a second heat exchanger, a heat transfer fluid pump, and a downstream end in upstream flow communication with the first heat exchanger, the heat transfer fluid pump being adapted and configured to receive the heat transfer fluid from the second heat exchanger and direct it to the first heat exchanger;
    the second heat exchanger is adapted and configured to warm cooled heat transfer fluid received from the first heat exchanger; and
    the first heat exchanger is adapted and configured to exchange heat between the heat transfer fluid flowing through the heat transfer circuit and liquid hydrogen in the filling circuit so as to cool the heat transfer fluid and vaporize the liquid hydrogen to provide the pressurized, gaseous hydrogen for filling the hydrogen-fueled vehicle tank, the flow of liquid hydrogen inside the first heat exchanger being surrounded by the flow of the heat transfer fluid,
    wherein the heat transfer fluid circuit further comprises a blower that is adapted and configured to blow ambient air at the second heat exchanger so as to warm the heat transfer fluid with the heat of the blown ambient air.

2. The station of claim 1, further comprising a liquid hydrogen pump in downstream flow communication with the liquid hydrogen source and upstream flow communication with the first heat exchanger that is adapted and configured to increase a pressure of the flow of liquid hydrogen from the liquid hydrogen source and direct the pressurized flow of liquid hydrogen towards the first heat exchanger.

3. The station of claim 1, wherein the filling circuit further comprises a pressure control valve and a pressure sensor downstream of the first exchanger and the pressure control valve is adapted and configured to control a pressure of the pressurized, gaseous hydrogen for filling the tank based upon a pressure of the pressurized, gaseous hydrogen measured by the pressure sensor.

4. The station of claim 1, wherein the second heat exchanger is an electric heater adapted and configured to warm the heat transfer fluid.

5. The station of claim 1, further comprising two or more buffer containers, a leg branching off of the filling circuit downstream of the first heat exchanger that is adapted and configured to direct the pressurized, gaseous hydrogen from the first heat exchanger to the two or more buffer containers, a set of valves, and a pressure control valve, the set of valves being adapted and configured to allow the pressurized, gaseous hydrogen to flow through the leg and into one of the two or more buffer containers but not into other of the two or more buffer containers and allow the pressurized, gaseous hydrogen to flow from one of the two or more buffer containers through the leg and to the downstream end of the filling circuit, the pressure control valve being adapted and configured to control a pressure of the pressurized, gaseous hydrogen flowing out of the downstream end of the filling circuit based upon a pressure sensed by a pressure sensor disposed in the filling circuit between the leg and the downstream end of the filling circuit.

6. The station of claim 1, wherein the filling circuit further comprises a primary line in fluid communication between the upstream and downstream ends of the filling circuit, a bypass line that branches off from the primary line and recombines with the primary line downstream of the first heat exchanger, a flow control valve disposed in the primary line, a flow control valve disposed in the bypass line, and a temperature sensor disposed in the filling circuit downstream of a point where the bypass line recombines with the primary line and upstream of the downstream end of the filling circuit, the first heat exchanger being disposed in the primary line, the flow control valve disposed in the primary line being adapted and configured to control a flow of vaporized hydrogen flowing through the primary line, the flow control valve disposed in the bypass lines being adapted and configured to control a flow of liquid hydrogen flowing through the bypass line, the flow control valves controlling the flows of vaporized hydrogen and liquid hydrogen to in turn control a temperature of the pressurized, gaseous hydrogen for filling the hydrogen-fueled vehicle tank that is based upon a temperature sensed by the temperature sensor.

7. The station of claim 1, wherein the heat transfer circuit further comprises a heat transfer reservoir in fluid communication between the second heat exchanger and the heat transfer fluid pump, the heat transfer reservoir being adapted and configured to contain a volume of the heat transfer fluid.

8. A hydrogen refilling station, comprising a liquid hydrogen source adapted and configured to store liquid hydrogen, a filling circuit, and a heat exchange fluid circuit, wherein:
the filling circuit has an upstream end in downstream fluid communication with the liquid hydrogen source to allow a flow of liquid hydrogen from the liquid hydrogen source into the filling circuit, a downstream end adapted and configured to be removably connected with a hydrogen-fueled vehicle tank for filling of the hydrogen-fueled vehicle tank with liquid hydrogen, and a first heat exchanger disposed between the upstream and downstream ends of the filling circuit;
the heat transfer circuit comprises, in flow order, an upstream end in downstream flow communication with the first heat exchanger, a second heat exchanger, a heat transfer fluid pump, and a downstream end in upstream flow communication with the first heat exchanger, the heat transfer fluid pump being adapted and configured to receive the heat transfer fluid from the second heat exchanger and direct it to the first heat exchanger;
the second heat exchanger is adapted and configured to warm cooled heat transfer fluid received from the first heat exchanger;
the first heat exchanger is adapted and configured to exchange heat between the heat transfer fluid flowing through the heat transfer circuit and liquid hydrogen in the filling circuit so as to cool the heat transfer fluid and vaporize the liquid hydrogen to provide the pressurized, gaseous hydrogen for filling the hydrogen-fueled vehicle tank, the flow of liquid hydrogen inside the first heat exchanger being surrounded by the flow of the heat transfer fluid;
the heat transfer circuit further comprises a primary line, a bypass line, a three-way flow control valve, a temperature sensor, and a downstream line in flow communication between the three-way flow control valve and the heat transfer fluid pump;
the primary line extends in flow communication between the first heat exchanger and the three-way flow control valve;
the bypass line branches off of the primary line and is in upstream flow communication with the three-way flow control valve;
the second heat exchanger is disposed in the primary line;
the three-way flow control valve controls flows of warmed heat transfer fluid from the primary line and non-warmed heat transfer fluid from the bypass line, combines the flow of the warmed heat transfer fluid from the primary line and the flow of the non-warmed heat transfer fluid from the bypass line, and directs the combined flow of heat transfer fluid to the heat transfer pump;
the temperature sensor is disposed in the heat transfer circuit in between the three-way flow control valve and the first heat exchanger; and
the three-way control valve controls a temperature of the heat transfer fluid in between the three-way control valve and the first heat exchanger by adjusting a ratio of the flow rate of the warmed heat transfer fluid to the flow rate of the non-warmed heat transfer fluid in the combined flow of heat transfer fluid.

9. The station claim 8, wherein the heat transfer fluid circuit further comprises a blower that is adapted and configured to blow ambient air at the second heat exchanger so as to warm the heat transfer fluid with the heat of the blown ambient air.

10. A hydrogen refilling station, comprising a liquid hydrogen source adapted and configured to store liquid hydrogen, first and second filling circuits, a heat transfer fluid reservoir, and first and second heat exchange fluid circuits, wherein:
the first filling circuit has an upstream end in downstream fluid communication with the liquid hydrogen source to allow a flow of liquid hydrogen from the liquid hydrogen source into the first filling circuit, a downstream end adapted and configured to be removably connected with a hydrogen-fueled vehicle tank for filling of the hydrogen-fueled vehicle tank with liquid hydrogen, and a first heat exchanger disposed between the upstream and downstream ends of the first filling circuit;
the second filling circuit has an upstream end in downstream fluid communication with the liquid hydrogen source to allow a flow of liquid hydrogen from the liquid hydrogen source into the second filling circuit, a downstream end adapted and configured to be removably connected with a hydrogen-fueled vehicle tank for filling of the hydrogen-fueled vehicle tank with liquid hydrogen, and a first heat exchanger disposed between the upstream and downstream ends of the second filling circuit;
the first heat transfer circuit comprises, in flow order, an upstream end in downstream flow communication with the first heat exchanger of the first filling circuit, a second heat exchanger, a heat transfer fluid pump, and a downstream end in upstream flow communication with the first heat exchanger of the first filling circuit, the heat transfer fluid pump of the first heat transfer circuit being adapted and configured to receive the heat transfer fluid from the second heat exchanger of the first heat transfer circuit and direct it to the first heat exchanger of the first filling circuit;
the second heat transfer circuit comprises, in flow order, an upstream end in downstream flow communication with the first heat exchanger of the second filling circuit, a second heat exchanger, a heat transfer fluid pump, and a downstream end in upstream flow communication with the first heat exchanger of the second filling circuit, the heat transfer fluid pump of the second heat transfer circuit being adapted and configured to receive the heat transfer fluid from the second heat exchanger of the second heat transfer circuit and direct it to the first heat exchanger of the second filling circuit;

the second heat exchanger of the first heat transfer circuit is adapted and configured to warm cooled heat transfer fluid received from the first heat exchanger of the first heat transfer circuit;

the second heat exchanger of the second heat transfer circuit is adapted and configured to warm cooled heat transfer fluid received from the first heat exchanger of the second heat transfer circuit;

the heat transfer fluid reservoir is in fluid communication between the second heat exchanger and heat transfer fluid pump of the first heat transfer circuit and is in fluid communication between the second heat exchanger and heat transfer fluid pump of the second heat transfer circuit;

the first heat exchanger of the first filling circuit is adapted and configured to exchange heat between the heat transfer fluid flowing through the first heat transfer circuit and liquid hydrogen in the first filling circuit so as to cool the heat transfer fluid and vaporize the liquid hydrogen to provide the pressurized, gaseous hydrogen for filling a tank of a hydrogen-fueled vehicle, the flow of liquid hydrogen inside the first heat exchanger of the first filling circuit being surrounded by the flow of the heat transfer fluid; and the first heat exchanger of the second filling circuit is adapted and configured to exchange heat between the heat transfer fluid flowing through the second heat transfer circuit and liquid hydrogen in the second filling circuit so as to cool the heat transfer fluid and vaporize the liquid hydrogen to provide the pressurized, gaseous hydrogen for filling a tank of a hydrogen-fueled vehicle, the flow of liquid hydrogen inside the first heat exchanger of the second filling circuit being surrounded by the flow of the heat transfer fluid.

11. The station of claim 10, further comprising:

a first liquid hydrogen pump in downstream flow communication with the liquid hydrogen source and upstream flow communication with the first heat exchanger of the first filling circuit that is adapted and configured to increase a pressure of the flow of liquid hydrogen from the liquid hydrogen source and direct the pressurized flow of liquid hydrogen towards the first heat exchanger of the first filling circuit; and a second liquid hydrogen pump in downstream flow communication with the liquid hydrogen source and upstream flow communication with the first heat exchanger of the second filling circuit that is adapted and configured to increase a pressure of the flow of liquid hydrogen from the liquid hydrogen source and direct the pressurized flow of liquid hydrogen towards the first heat exchanger of the second filling circuit.

12. The station of claim 10, wherein each of the first and second filling circuits further comprises a pressure control valve and a pressure sensor downstream of the associated first heat exchanger and the pressure control valve is adapted and configured to control a pressure of the pressurized, gaseous hydrogen for filling a tank of a hydrogen-fueled vehicle based upon a pressure of the pressurized, gaseous hydrogen measured by the pressure sensor.

13. The station of claim 10, wherein:

each of the first and second heat transfer circuits further comprises a primary line, a bypass line, a three-way flow control valve, a temperature sensor, and a downstream line in flow communication between the three-way flow control valve and the heat transfer fluid pump;

each primary line extends in flow communication between the associated first heat exchanger and the associated three-way flow control valve;

each bypass line branches off of the associated primary line and is in upstream flow communication with the associated three-way flow control valve;

each second heat exchanger is disposed in the associated primary line;

each three-way flow control valve controls flows of warmed heat transfer fluid from the associated primary line and non-warmed heat transfer fluid from the associated bypass line, combines the flow of the warmed heat transfer fluid from the associated primary line and the flow of the non-warmed heat transfer fluid from the associated bypass line, and directs the combined flow of heat transfer fluid to the associated heat transfer pump;

each temperature sensor is disposed in the associated first and second heat transfer circuit in between the associated three-way flow control valve and the associated first heat exchanger; and each three-way control valve controls a temperature of the heat transfer fluid in between it and the associated first heat exchanger by adjusting a ratio of the flow rate of the warmed heat transfer fluid to the flow rate of the non-warmed heat transfer fluid in the combined flow of heat transfer fluid.

14. The station of claim 10, wherein each of the first and second heat transfer fluid circuits further comprises a blower that is adapted and configured to blow ambient air at the associated second heat exchanger so as to warm the heat transfer fluid with the heat of the blown ambient air.

15. The station of claim 10, wherein each second heat exchanger is an electric heater adapted and configured to warm the heat transfer fluid.

16. The station of claim 10, wherein each of the first and second filling circuits, further comprises:

a primary line in fluid communication between its upstream and downstream ends;

a bypass line that branches off from the associated primary line and recombines with the associated primary line downstream of the associated first heat exchanger;

a flow control valve disposed in the associated primary line;

a flow control valve disposed in the associated bypass line; and a temperature sensor disposed downstream of a point where the associated bypass line recombines with the associated primary line and upstream of the associated downstream end thereof, wherein: the associated first heat exchanger is disposed in the associated primary line; the flow control valve disposed in the associated primary line being adapted and configured to control a flow of vaporized hydrogen flowing through the associated primary line; the flow control valve disposed in the associated bypass line being adapted and configured to control a flow of liquid hydrogen flowing through the associated bypass line, the flow control valves controlling the flows of vaporized hydrogen and liquid hydrogen to in turn control a temperature of the pressurized, gaseous hydrogen for filling a tank of a hydrogen-fueled vehicle that is based upon a temperature sensed by the temperature sensor.

* * * * *